US011882033B2

United States Patent
Miklós et al.

(10) Patent No.: US 11,882,033 B2
(45) Date of Patent: Jan. 23, 2024

(54) FILTERING ETHERNET DEVICE SOURCE ADDRESSES FOR LOOP AVOIDANCE

(71) Applicant: Telefonaktiebolaget LM Ericsson (publ), Stockholm (SE)

(72) Inventors: György Miklós, Pilisborosjenö (HU); Balázs Varga, Budapest (HU); János Farkas, Kecskemét (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 147 days.

(21) Appl. No.: 17/439,530

(22) PCT Filed: Mar. 16, 2020

(86) PCT No.: PCT/IB2020/052382
§ 371 (c)(1),
(2) Date: Sep. 15, 2021

(87) PCT Pub. No.: WO2020/188464
PCT Pub. Date: Sep. 24, 2020

(65) Prior Publication Data
US 2022/0158940 A1    May 19, 2022

Related U.S. Application Data

(60) Provisional application No. 62/818,817, filed on Mar. 15, 2019.

(51) Int. Cl.
*H04W 80/02*    (2009.01)
*H04L 45/00*    (2022.01)
(Continued)

(52) U.S. Cl.
CPC .......... *H04L 45/66* (2013.01); *H04L 12/4625* (2013.01); *H04W 80/02* (2013.01); *H04L 2101/622* (2022.05)

(58) Field of Classification Search
CPC ... H04L 45/66; H04L 2101/622; H04W 80/02
See application file for complete search history.

(56) References Cited

U.S. PATENT DOCUMENTS 10,812,629 B2 * 10/2020 Park ..................... H04W 76/15
10,951,427 B2 *  3/2021 Qiao ................... H04L 12/1492
(Continued)

FOREIGN PATENT DOCUMENTS

KR    20180107000 A    10/2018

OTHER PUBLICATIONS

Author Unknown, "Technical Specification Group Services and System Aspects; Study on enhancement of Ultra-Reliable Low-Latency Communication (URLLC) support in the 5G Core network (5GC) (Release 16)," Technical Report 23.725, Version 16.0.0, 3GPP Organizational Partners, Dec. 2018, 76 pages.
(Continued)

*Primary Examiner* — Fahmida S Chowdhury
(74) *Attorney, Agent, or Firm* — Sage Patent Group

(57) ABSTRACT

Systems and methods are disclosed herein for filtering Ethernet device source addresses for loop avoidance in a cellular communications system. Embodiments of a method performed by a User Plane Function (UPF) in a core network of a cellular communications system and corresponding embodiments of a UPF are disclosed. In some embodiments, a method performed by a UPF in a core network of a cellular communications system comprises obtaining a Medium Access Control (MAC) address that is reachable over a particular Protocol Data Unit (PDU) session. The method further comprises installing, at the UPF, a filtering rule that prevents Ethernet frames having the MAC address as a source address from being delivered by the UPF via downlink on the particular PDU session. In this manner, loopback of Ethernet frames on the PDU session is avoided.

21 Claims, 10 Drawing Sheets

(51) Int. Cl.
    *H04L 12/46*     (2006.01)
    *H04L 101/622*     (2022.01)

(56) References Cited

U.S. PATENT DOCUMENTS

| | | | |
|---|---|---|---|
| 2018/0338265 A1* | 11/2018 | Goel | H04L 45/02 |
| 2019/0116521 A1* | 4/2019 | Qiao | H04L 69/04 |
| 2019/0124181 A1* | 4/2019 | Park | H04W 36/08 |
| 2019/0124572 A1* | 4/2019 | Park | H04W 80/10 |
| 2019/0215729 A1* | 7/2019 | Oyman | H04L 65/1016 |
| 2019/0253917 A1* | 8/2019 | Dao | H04W 28/0268 |

OTHER PUBLICATIONS

Author Unknown, "Technical Specification Group Services and System Aspects; System Architecture for the 5G System; Stage 2 (Release 15)," Technical Specification 23.501, Version 15.4.0, 3GPP Organizational Partners, Dec. 2018, 236 pages.

Author Unknown, "Technical Specification Group Services and System Aspects; Procedures for the 5G System; Stage 2 (Release 15)," Technical Specification 23.502, Version 15.4.1, 3GPP Organizational Partners, Jan. 2019, 347 pages.

Allan, David, et al., "Provider Link State Bridging," IEEE Communications Magazine, Sep. 2008, IEEE, pp. 110-117.

International Search Report and Written Opinion for International Patent Application No. PCT/IB2020/052382, dated Jun. 17, 2020, 15 pages.

* cited by examiner

FILTERING ETHERNET DEVICE SOURCE ADDRESSES FOR LOOP AVOIDANCE

RELATED APPLICATIONS

This application is a 35 U.S.C. § 371 national phase filing of International Application No. PCT/IB2020/052382, filed Mar. 16, 2020, which claims the benefit of provisional patent application Ser. No. 62/818,817, filed Mar. 15, 2019, the disclosures of which are hereby incorporated herein by reference in their entireties.

TECHNICAL FIELD

The present disclosure relates to a cellular communications system and, in particular, delivery of native Ethernet traffic through a cellular communications system.

BACKGROUND

The Third Generation Partnership Project (3GPP) Fifth Generation (5G) System (5GS) supports the delivery of native Ethernet traffic using Ethernet Protocol Data Unit (PDU) Sessions, as defined in 3GPP Technical Specification (TS) 23.501 V15.4.0, Section 5.6.10.2. Ethernet PDU Sessions can carry Ethernet frames between the User Equipment (UE) and the User Plane Function (UPF) acting as the PDU Session Anchor (PSA). The specification mentions two possible configurations for handling the Ethernet traffic on the N6 reference point, i.e. between the UPF and the external Ethernet Data Network:

Configuration A: For Configuration A, there is a 1-1 relationship between a PDU Session and a N6 interface possibly corresponding to a dedicated tunnel established over N6. In this case, the UPF acts as PSA and transparently forwards Ethernet frames between the PDU Session and its corresponding N6 interface, and the UPF does not need to be aware of Medium Access Control (MAC) addresses used by the UE in order to route downlink traffic.

Configuration B: For Configuration B, more than one PDU Session to the same Data Network Name (DNN) (e.g., for more than one UE) corresponds to the same N6 interface. In this case, the UPF acting as PSA needs to be aware of MAC addresses used by the UE in the PDU Session in order to map downlink Ethernet frames received over N6 to the appropriate PDU Session.

Configuration B is considered herein. Particularly, Configuration B is considered for which the forwarding behavior of the UPF acting as PSA is managed by a Session Management Function (SMF) as specified in TS 23.501 V15.4.0, Section 5.8.2.5, is as follows. When configuring a UPF acting as PSA for an Ethernet PDU Session Type, the SMF may instruct the UPF to route the downlink traffic based on the MAC address(es) used by the UE for the uplink traffic. In that case, broadcast and/or multicast downlink traffic on the N6 Network Instance targets every downlink PDU Session (corresponding to any N4 Session) associated with this Network Instance. For uplink broadcast and/or multicast traffic received by the UPF over a PDU session on a N3/N9 interface, the UPF should forward the traffic to the N6 interface and downlink to every PDU session (except the one of the incoming traffic) associated with the same N6 Network Instance.

The specification also notes that local policies in UPF associated with the Network Instance can prevent local traffic switching in the UPF between PDU Sessions either for unicast traffic only or for any traffic.

If allowed by local UPF (acting as PSA) policies, for Ethernet traffic with unknown unicast destination MAC addresses, the UPF should forward the traffic in the same manner as described above for the broadcast and/or multicast traffic handling.

The SMF may ask to get notified with the source MAC addresses used by the UE and provide the UPF with corresponding forwarding rules related with these MAC addresses.

SUMMARY

Systems and methods are disclosed herein for filtering Ethernet device source addresses for loop avoidance in a cellular communications system. Embodiments of a method performed by a User Plane Function (UPF) in a core network of a cellular communications system and corresponding embodiments of a UPF are disclosed. In some embodiments, a method performed by a UPF in a core network of a cellular communications system comprises obtaining a Medium Access Control (MAC) address that is reachable over a particular Protocol Data Unit (PDU) session. The method further comprises installing, at the UPF, a filtering rule that prevents Ethernet frames having the MAC address as a source address from being delivered by the UPF via downlink on the particular PDU session. In this manner, loopback of Ethernet frames on the PDU session is avoided.

In some embodiments, the method further comprises filtering of Ethernet frames at the UPF in accordance with the filtering rule. In some embodiments, performing filtering of Ethernet frames at the UPF in accordance with the filtering rule comprises performing filtering of broadcast Ethernet frames at the UPF in accordance with the filtering rule.

In some embodiments, the method further comprises determining that the filtering rule is to be deleted and deleting the filtering rule at the UPF. In some embodiments, determining that the filtering rule is to be deleted comprises detecting that the MAC address is inactive. In some embodiments, determining that the filtering rule is to be deleted comprises detecting, by a configured inactivity timeout, that the MAC address is no longer active. In some embodiments, the inactivity timeout is dynamically configured.

In some embodiments, the particular PDU session is a PDU session between the UPF, which operates as a PDU session anchor, and a User Equipment (UE) in the cellular communications system.

In some embodiments, a network node that implements a UPF in a core network of a cellular communications system is adapted to obtain a MAC address that is reachable over a particular PDU session and install, at the UPF, a filtering rule that prevents Ethernet frames having the MAC address as a source address from being delivered by the UPF via downlink on the particular PDU session.

In some embodiments, the network node comprises processing circuitry configured to cause the network node to obtain the address that is reachable over the particular PDU session and install the filtering rule at the UPF.

In some other embodiments, a method performed by a UPF in a core network of a cellular communications system comprises obtaining a MAC address that is reachable over a particular PDU session and reporting the MAC address that is reachable over the particular PDU session to another network entity. The method further comprises receiving, from the other network entity, a filtering rule to be applied by the UPF to prevent Ethernet frames having the MAC address as a source address from being delivered by the UPF via downlink on the particular PDU session.

In some embodiments, the method further comprises performing filtering of Ethernet frames at the UPF in accordance with the filtering rule. In some embodiments, performing filtering of Ethernet frames at the UPF in accordance with the filtering rule comprises performing filtering of broadcast Ethernet frames at the UPF in accordance with the filtering rule.

In some embodiments, the method further comprises determining that the MAC address is no longer reachable and reporting, to the other network entity, that the MAC address is no longer reachable. In some embodiments, the method further comprises receiving, from the other network entity, an instruction to delete the filtering rule at the UPF. In some embodiments, determining that the MAC address is no longer reachable comprises detecting, by a configured inactivity timeout, that the MAC address is no longer active. In some embodiments, the inactivity timeout is dynamically configured.

In some embodiments, the particular PDU session is a PDU session between the UPF, which operates as a PDU session anchor, and a UE in the cellular communications system.

In some embodiments, the other network entity is a Session Management Function (SMF) in the core network of the cellular communications system.

In some embodiments, a network node that implements a UPF in a core network of a cellular communications system is adapted to obtain a MAC address that is reachable over a particular PDU session, report the MAC address that is reachable over the particular PDU session to another network entity, and receive, from the other network entity, a filtering rule to be applied by the UPF to prevent Ethernet frames having the MAC address as a source address from being delivered by the UPF via downlink on the particular PDU session.

In some embodiments, the network node comprises processing circuitry configured to cause the network node to obtain the MAC address that is reachable over the particular PDU session, report the MAC address that is reachable over the particular PDU session to the other network entity, and receive the filtering rule from the other network entity.

In some embodiments, a method performed by a network entity in a core network of a cellular communications system comprises receiving information from a UPF that indicates a MAC address that is reachable over a particular PDU session between the UPF, which acts as a PDU session anchor, and a UE. The method further comprises sending, to the UPF, a filtering rule that prevents Ethernet frames having the MAC address as a source address from being delivered by the UPF via downlink on the particular PDU session.

In some embodiments, the method further comprises receiving, from the UPF, information that indicates that the MAC address is no longer reachable and sending, to the UPF, an instruction to delete the filtering rule.

In some embodiments, the other network entity is a SMF in the core network of the cellular communications system.

In some embodiments, a network node that implements a network entity in a core network of a cellular communications system is adapted to receive information from a UPF that indicates a MAC address that is reachable over a particular PDU session between the UPF, which acts as a PDU session anchor, and a UE. The network node is further adapted to send, to the UPF, a filtering rule that prevents Ethernet frames having the MAC address as a source address from being delivered by the UPF via downlink on the particular PDU session.

In some embodiments, the network node comprises processing circuitry configured to cause the network node to receive the information from the UPF that indicates the MAC address that is reachable over the particular PDU session between the UPF, which acts as the PDU session anchor, and the UE, and send the filtering rule to the UPF.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
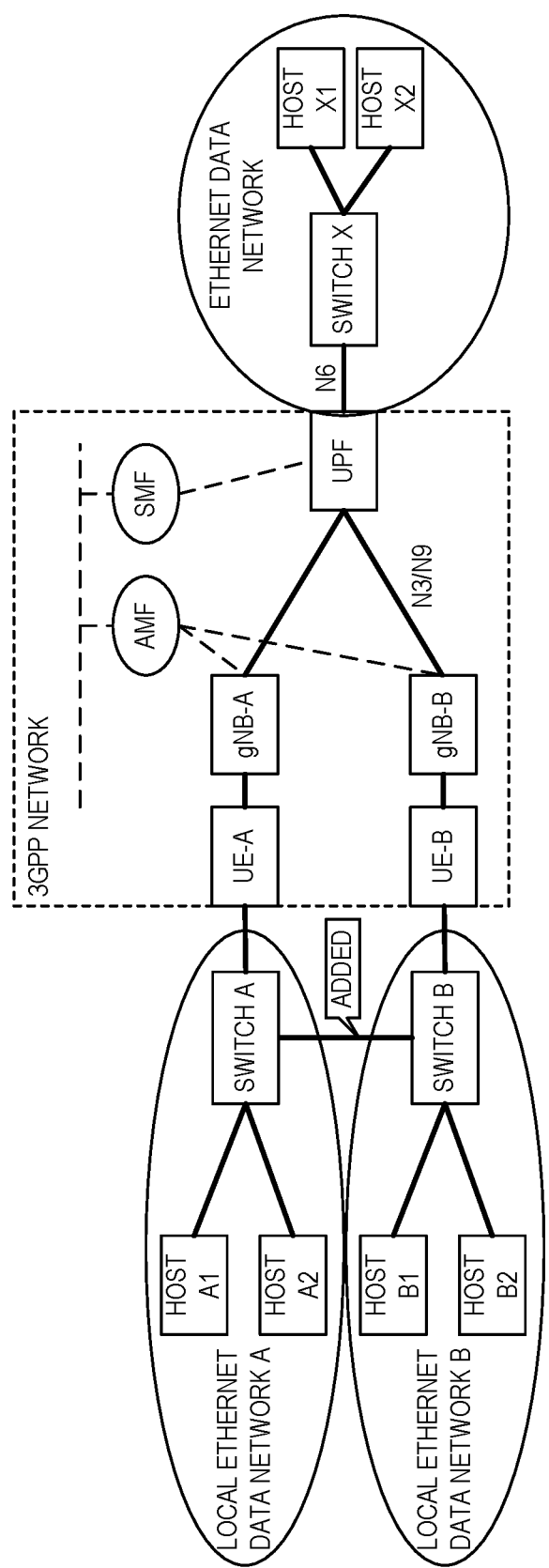
FIGS. 1 to 3 illustrate example network setups related to delivery of Ethernet traffic in a Third Generation Partnership Project (3GPP) Fifth Generation (5G) System (5GS) in which loopback may occur.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless device.

Radio Access Node: As used herein, a "radio access node" or "radio network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), and a relay node.

Core Network Entity: As used herein, a "core network entity" is any type of entity in a core network. Some examples of a core network entity include, e.g., a Mobility Management Entity (MME), a Packet Data Network Gateway (P-GW), a Service Capability Exposure Function (SCEF), or the like in an Evolved Packet Core (EPC). Some other examples of a core network entity include, e.g., an Access and Mobility Management Function (AMF), a Network Slice Selection Function (NSSF), an Authentication Server Function (AUSF), a Unified Data Management (UDM), a Session Management Function (SMF), a Policy Control Function (PCF), an Application Function (AF), a Network Exposure Function (NEF), a User Plane Function (UPF), or the like in a 5G Core (5GC). A core network entity may be implemented as a physical network node (e.g., including hardware or a combination of hardware and software) or implemented as a functional entity (e.g., as software) that is, e.g., implemented on a physical network node or distributed across two or more physical network nodes.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a User Equipment (UE) in a 3GPP network and a Machine Type Communication (MTC) device.

Network Node: As used herein, a "network node" is any node that is either part of the RAN or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

There currently exist certain challenge(s) related to delivery of native Ethernet traffic in a 3GPP 5G System (5GS). An exemplary non-trivial network setup is shown in FIG. 1. In FIG. 1, there are two UEs (denoted UE-A and UE-B). UE-A and UE-B each set up a respective Protocol Data Unit (PDU) session that spans up to the same UPF, which connects to an external Ethernet Data Network over the N6 reference point. The Data Network includes Ethernet Switch X and Ethernet Hosts X1, X2. On the terminal side, in the illustrated example, there is also a fixed Local Data Network at each UE, so that multiple hosts may connect via the same UE. In particular, Hosts A1 and A2 connect via Switch A and UE-A, while Hosts B1 and B2 connect via Switch B and UE-B. The link between Switch A and Switch B is initially not present; the network setup is such that each host is initially connected to the Ethernet Data Network via a maximum of one UE.

The UPF has standardized functionality, such as learning MAC addresses and forwarding multicast/broadcast frames, which make it similar to an Ethernet switch. However, the UPF is not required to perform all actions that are generally supported by Ethernet switches such as, e.g., setting up a spanning tree. Nevertheless, this setup may be used for simple topologies, e.g. when each host is connected via no more than one UE at a time.

Consider now that a direct link is added between Switch A and Switch B. Such a link may be added by mistake, e.g. a person falsely believing that this may improve forwarding efficiency or redundancy adds the direct link between the switches. Consider now that Host A1 sends an Ethernet broadcast frame. In this case, it may happen that this Ethernet broadcast frame is delivered from Switch A to Switch B. Switch B then forwards the Ethernet broadcast frame via UE-B and a gNB-B to the UPF. The UPF then forwards the Ethernet broadcast frame via a gNB-A and UE-A to Switch A, thereby creating a forwarding loop.

Figure 2:
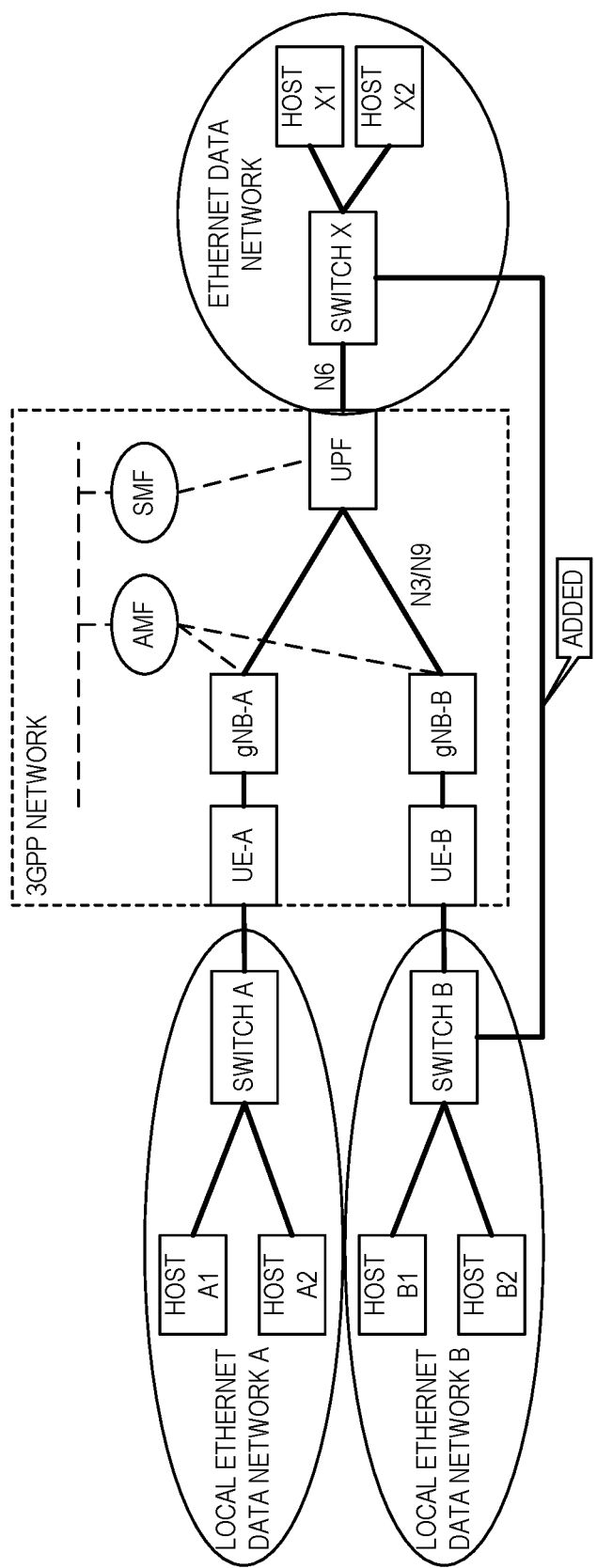

Another example is shown in FIG. 2, which is initially the same as for the previous example. Instead of a direct link between Switch A and Switch B, a person may add a direct link between Switch B and Switch X, falsely believing that this may improve communication efficiency or redundancy.

Looking at FIG. 2, consider in this example that Host B1 now sends an Ethernet broadcast frame. Switch B may forward this Ethernet broadcast frame over the direct link to Switch X, which would forward the frame over N6 to the UPF. The UPF would then deliver the Ethernet broadcast frame over both the PDU session to UE-A as well as the PDU session to UE-B. The frame going through UE-B then causes a forwarding loop back to Switch B.

Figure 3:
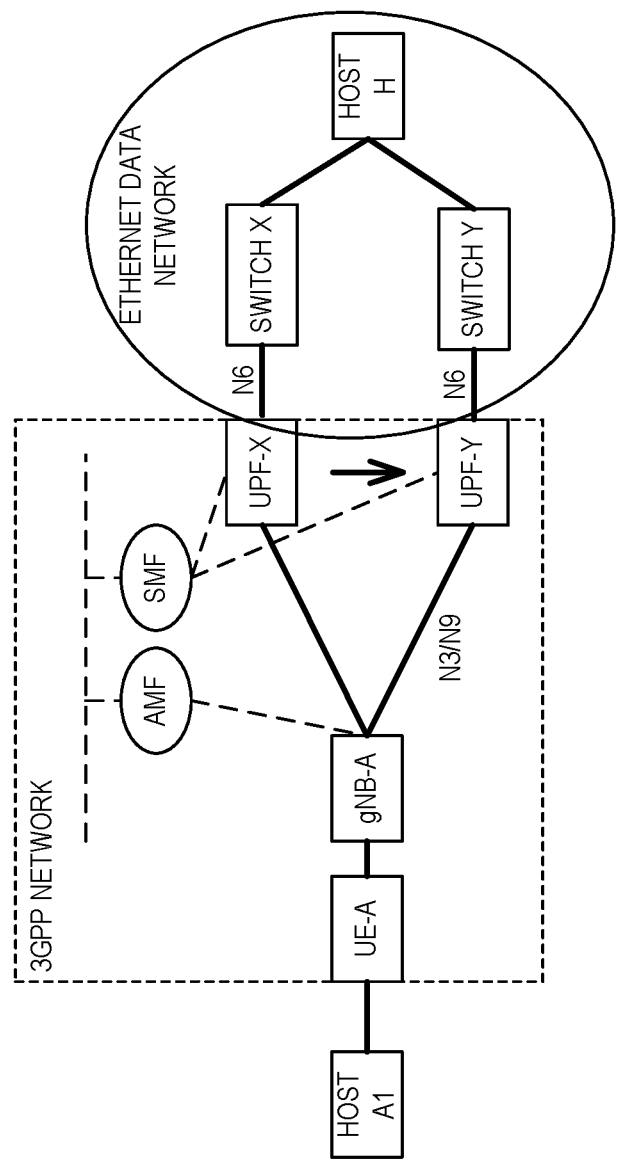

A third example is illustrated in FIG. 3 and shows the case of UPF relocation, as described in 3GPP Technical Report (TR) 23.725, Section 6.11. Initially, the PDU session goes via UPF-X acting as the PDU Session Anchor (PSA). The SMF decides to relocate the PSA to UPF-Y. According to the procedure, there is a short transitional period while downlink frames are also delivered via UPF-X, even though uplink frames already go through UPF-Y. In case the Host A1 sends a broadcast frame during this transitional period of time, or in case UPF-Y sends a broadcast frame on behalf of Host A1 to update the forwarding in the Ethernet Data Network (as described in TR 23.725, section 6.11), that broadcast frame may be delivered via Switch Y and Switch X back to UPF-X which reaches Host A1, forming a loop.

Loops are to be avoided in Ethernet networks, as they risk the stability of the network due to the infinite forwarding that a loop may imply.

Certain aspects of the present disclosure and their embodiments may provide solutions to the aforementioned or other challenges. In some embodiments, a filtering rule is installed for each PDU Session at the UPF. For each PDU session, the filtering rule for that PDU session is configured to filter out downlink packets (e.g., downlink Ethernet frames) on the PDU Session with a source address equal to a source address that is reachable over the PDU session (e.g., equal to a source address that has been learned by the UPF in uplink packets (e.g., in uplink Ethernet (e.g., broadcast) frames received over the PDU session)). For each PDU session, this prevents the delivery of downlink frames from a source that is reachable over that PDU Session.

In some embodiments, a filtering rule in the UPF prevents downlink Ethernet frames with a source address that equals an address that is reachable over the given PDU Session.

Certain embodiments may provide one or more of the following technical advantage(s).

Embodiments of the present disclosure prevent forwarding loops in the Ethernet network which may be formed due to the addition of direct Ethernet links which were originally not set up.

Embodiments of the present disclosure prevent forwarding loops which may be formed during the transitional period of time during anchor relocation for an Ethernet PDU Session while the old anchor still delivers downlink frames after the new anchor has been activated for uplink traffic.

Embodiments of the present disclosure filter out frames that should not normally pass through the 3GPP network, thereby increasing the overall security of the network. Without such filtering, the network is exposed to failure when a topology change takes place, hence there is a risk that, e.g., accidental human actions could easily do harm to the whole network.

Embodiments of the present disclosure relate to installing and using a filtering rule at a UPF for a PDU Session where the filtering rule for the PDU session is configured to filter out downlink packets (e.g., downlink Ethernet frames) on the PDU Session with a source address equal to a source address that is reachable over the PDU session (e.g., equal to a source address that has been learned by the UPF in uplink packets (e.g., in uplink Ethernet (e.g., broadcast) frames received over the PDU session)). This prevents the delivery of downlink frames from a source that that is reachable over that PDU Session.

Figure 4:
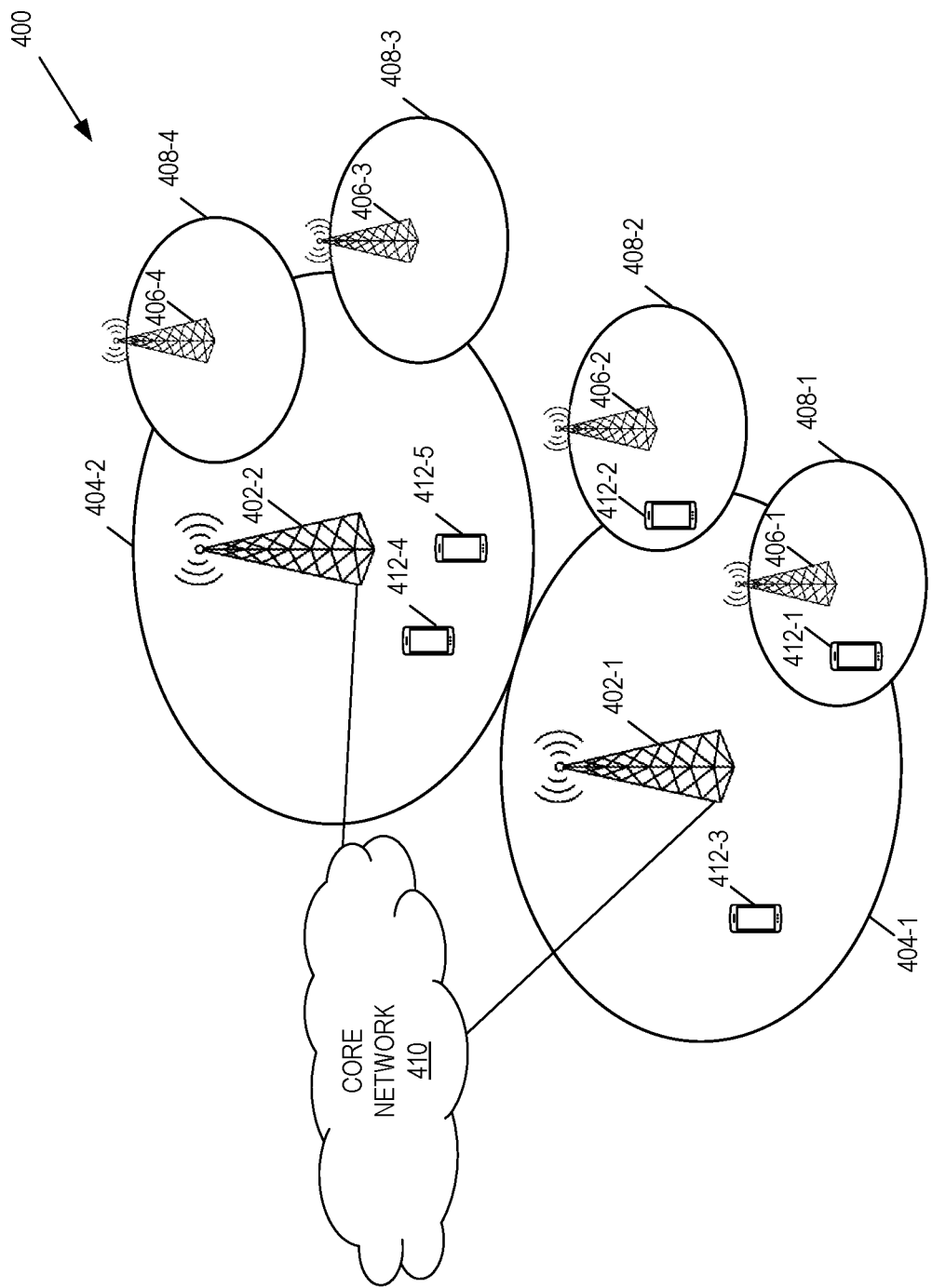
FIG. 4 illustrates one example of a cellular communications system in which embodiments of the present disclosure may be implemented.

In this regard, FIG. 4 illustrates one example of a cellular communications system 400 in which embodiments of the present disclosure may be implemented. In the embodiments described herein, the cellular communications system 400 is a 5GS including a NR RAN and a 5GC. In this example, the cellular communications system 400 includes base stations 402-1 and 402-2, which in 5G NR are referred to as gNBs, controlling corresponding macro cells 404-1 and 404-2. The base stations 402-1 and 402-2 are generally referred to herein collectively as base stations 402 and individually as base station 402. Likewise, the macro cells 404-1 and 404-2 are generally referred to herein collectively as macro cells 404 and individually as macro cell 404. The cellular communications system 400 may also include a number of low power nodes 406-1 through 406-4 controlling corresponding small cells 408-1 through 408-4. The low power nodes 406-1 through 406-4 can be small base stations (such as pico or femto base stations) or Remote Radio Heads (RRHs), or the like. Notably, while not illustrated, one or more of the small cells 408-1 through 408-4 may alternatively be provided by the base stations 402. The low power nodes 406-1 through 406-4 are generally referred to herein collectively as low power nodes 406 and individually as low power node 406. Likewise, the small cells 408-1 through 408-4 are generally referred to herein collectively as small cells 408 and individually as small cell 408. The base stations 402 (and optionally the low power nodes 406) are connected to a core network 410.

The base stations 402 and the low power nodes 406 provide service to wireless devices 412-1 through 412-5 in the corresponding cells 404 and 408. The wireless devices 412-1 through 412-5 are generally referred to herein collectively as wireless devices 412 and individually as wireless device 412. The wireless devices 412 are also sometimes referred to herein as UEs.

Figure 5:
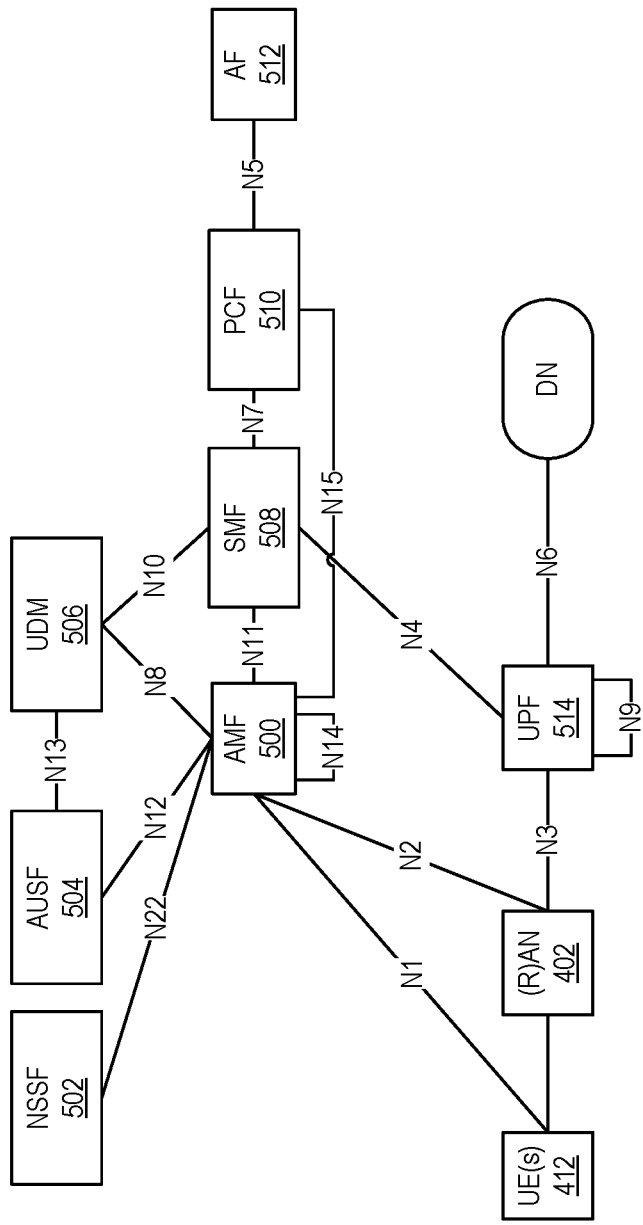
FIGS. 5 and 6 illustrate example 5GS architectures.

FIG. 5 illustrates a 5GS represented as a 5G network architecture composed of core Network Functions (NFs), where interaction between any two NFs is represented by a point-to-point reference point/interface. FIG. 5 can be viewed as one particular implementation of the system 400 of FIG. 4.

Seen from the access side the 5G network architecture shown in FIG. 5 comprises a plurality of UEs 412 connected to either a RAN or an Access Network (AN) (denoted by reference number 402) as well as an AMF 500. Typically, the R(AN) comprises base stations, e.g. such as eNBs or gNBs or similar. Seen from the core network side, the 5G core NFs shown in FIG. 5 include a NSSF 502, an AUSF 504, a UDM 506, the AMF 500, a SMF 508, a PCF 510, an AF 512, and a UPF 514.

Reference point representations of the 5G network architecture are used to develop detailed call flows in the normative standardization. The N1 reference point is defined to carry signaling between the UE 412 and AMF 500. The reference points for connecting between the AN 402 and AMF 500 and between the AN 402 and UPF 514 are defined as N2 and N3, respectively. There is a reference point, N11, between the AMF 500 and SMF 508, which implies that the SMF 508 is at least partly controlled by the AMF 500. N4 is used by the SMF 508 and UPF 514 so that the UPF 514 can be set using the control signal generated by the SMF 508, and the UPF 514 can report its state to the SMF 508. N9 is the reference point for the connection between different UPFs 514, and N14 is the reference point connecting between different AMFs 500, respectively. N15 and N7 are defined since the PCF 510 applies policy to the AMF 500 and SMF 508, respectively. N12 is required for the AMF 500 to perform authentication of the UE 412. N8 and N10 are defined because the subscription data of the UE 412 is required for the AMF 500 and SMF 508.

The 5GC network aims at separating user plane and control plane. The user plane carries user traffic while the control plane carries signaling in the network. In FIG. 5, the UPF 514 is in the user plane and all other NFs, i.e., the AMF 500, SMF 508, PCF 510, AF 512, NSSF 502, AUSF 504, and UDM 506, are in the control plane. Separating the user and control planes guarantees each plane resource to be scaled independently. It also allows UPFs 514 to be deployed separately from control plane functions in a distributed fashion. In this architecture, UPFs 514 may be deployed very close to UEs 412 to shorten the Round Trip Time (RTT) between UEs 412 and data network for some applications requiring low latency.

The core 5G network architecture is composed of modularized functions. For example, the AMF 500 and SMF 508 are independent functions in the control plane. Separated AMF 500 and SMF 508 allow independent evolution and scaling. Other control plane functions like the PCF 510 and AUSF 504 can be separated as shown in FIG. 5. Modularized function design enables the 5GC network to support various services flexibly.

Each NF interacts with another NF directly. It is possible to use intermediate functions to route messages from one NF to another NF. In the control plane, a set of interactions between two NFs is defined as service so that its reuse is possible. This service enables support for modularity. The user plane supports interactions such as forwarding operations between different UPFs.

Figure 6:
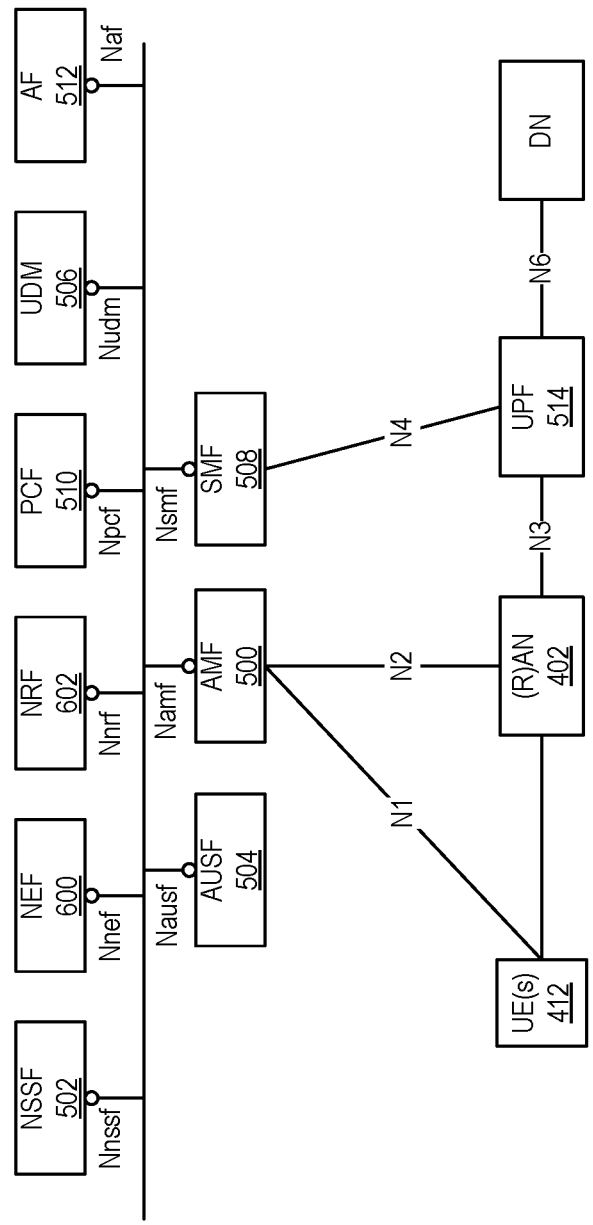

FIG. 6 illustrates a 5G network architecture using service-based interfaces between the NFs in the control plane, instead of the point-to-point reference points/interfaces used in the 5G network architecture of FIG. 5. However, the NFs described above with reference to FIG. 5 correspond to the NFs shown in FIG. 6. The service(s) etc. that a NF provides to other authorized NFs can be exposed to the authorized NFs through the service-based interface. In FIG. 6 the service based interfaces are indicated by the letter "N" followed by the name of the NF, e.g. Namf for the service based interface of the AMF 500 and Nsmf for the service based interface of the SMF 508, etc. NEF 600 and the Network Repository Function (NRF) 602 in FIG. 6 are not shown in FIG. 5 discussed above. However, it should be clarified that all NFs depicted in FIG. 5 can interact with the NEF 600 and the NRF 602 of FIG. 6 as necessary, though not explicitly indicated in FIG. 5.

Some properties of the NFs shown in FIGS. 5 and 6 may be described in the following manner. The AMF 500 provides UE-based authentication, authorization, mobility management, etc. A UE 412 even using multiple access technologies is basically connected to a single AMF 500 because the AMF 500 is independent of the access technologies. The SMF 508 is responsible for session management and allocates Internet Protocol (IP) addresses to UEs 412. It also selects and controls the UPF 514 for data transfer. If a UE 412 has multiple sessions, different SMFs 508 may be allocated to each session to manage them individually and possibly provide different functionalities per session. The AF 512 provides information on the packet flow to the PCF 510 responsible for policy control in order to support Quality of Service (QoS). Based on the information, the PCF 510 determines policies about mobility and session management to make the AMF 500 and SMF 508 operate properly. The AUSF 504 supports authentication function for UEs 412 or similar and thus stores data for authentication of UEs 412 or similar while the UDM 506 stores subscription data of the UE 412. The Data Network (DN), not part of the 5GC network, provides Internet access or operator services and similar.

An NF may be implemented either as a network element on a dedicated hardware, as a software instance running on a dedicated hardware, or as a virtualized function instantiated on an appropriate platform, e.g., a cloud infrastructure.

Now a description of embodiments of the present disclosure is provided. In a UPF-based embodiment, whenever the UPF learns a new MAC address that is reachable over a given PDU session based on the source address of an uplink Ethernet frame, a new filtering rule is automatically installed which prevents Ethernet frames with the same source address to be delivered downlink on the same PDU session. The filtering rule is applicable for unicast as well as for broadcast or multicast Ethernet frames.

Whenever the UPF detects, by a properly configured inactivity timeout, that a Medium Access Control (MAC) address that has been reachable over the given PDU session is no longer active and the corresponding MAC address is aged out for the given PDU session, the filter for the source address is removed. Optionally, it can be possible to dynamically change the inactivity timeout to a lower layer in case of network topology change in order to achieve a faster convergence time of the network topology update. It can be determined from protocol information, such as from the messages and fields of the Rapid Spanning Tree Protocol (RSTP) that there is an ongoing topology change.

When present, Virtual Local Area Network (VLAN) tags may be considered in combination with the MAC address to perform the filtering on a per VLAN basis for the given MAC address.

Figure 7:
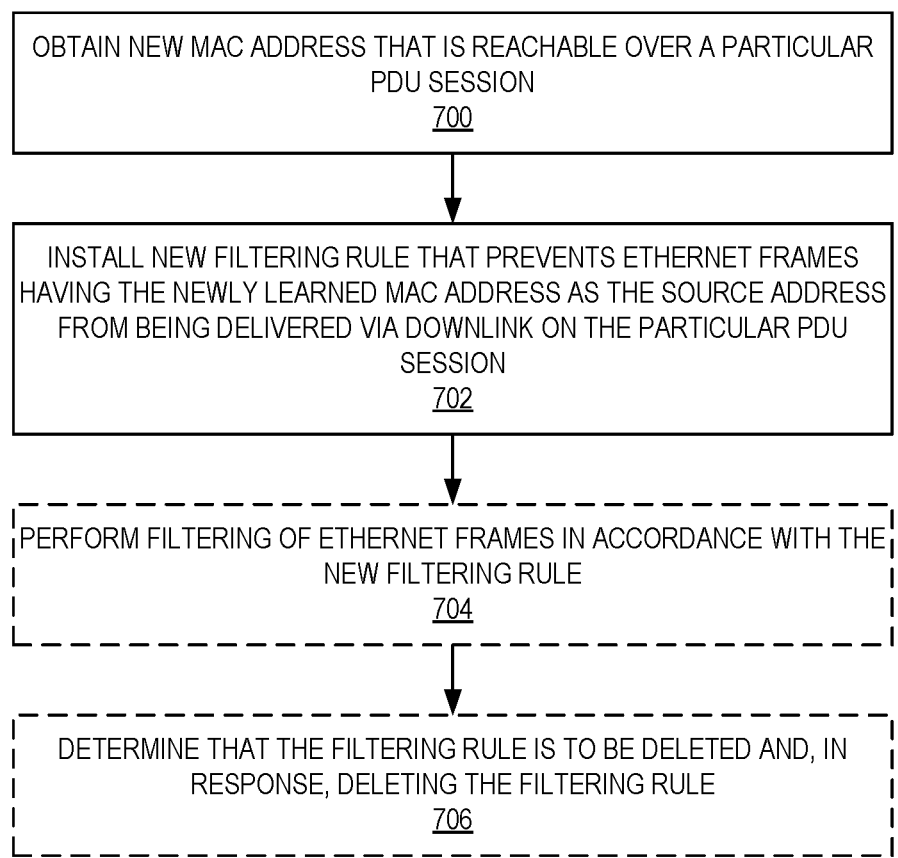
FIG. 7 is a flow chart that illustrates the operation of a User Plane Function (UPF) to provide loopback avoidance in accordance with at least some aspects of the present disclosure.

FIG. 7 illustrates at least some aspects of the UPF based embodiment. As illustrated, the UPF (e.g., UPF 514) obtains a new MAC address that is reachable over a particular PDU session (step 700). In some embodiments, the UPF detects (i.e., learns) a new MAC address that is reachable (via downlink) via the particular PDU session. In some other embodiments, the UPF otherwise obtains the new MAC address (e.g., the UPF is configured with the new MAC address that is reachable over the particular PDU session). The UPF (e.g., automatically) installs a new filtering rule at the UPF that prevents Ethernet frames having the newly learned MAC address as the source MAC address from being delivered via downlink on the particular PDU session (step 702). In other words, the UPF configures (and activates) the new filtering rule such that this new filtering rule is applied by the UPF to filter Ethernet frames having the newly learned MAC address as the source address from being delivered via downlink on the particular PDU session. Optionally, the UPF performs filtering of Ethernet frames in accordance with the new filtering rule (step 704). Optionally, at some point, the UPF determines that this filtering rule is to be deleted (e.g., upon detecting that the corresponding MAC address is no longer active) and deletes (or otherwise inactivates or removes) the filtering rule such that the filtering rule is no longer applied by the UPF (step 706).

In an SMF-based embodiment, whenever the UPF detects that a new MAC address that is reachable over a given PDU session based on the source address of an uplink Ethernet frame, the MAC address is reported to the SMF. The SMF installs a new filtering rule in the UPF which prevents Ethernet frames with the same source address to be delivered via downlink on the same PDU session. The filtering rule is applicable for unicast as well as for broadcast or multicast Ethernet frames.

Whenever the UPF detects, by a properly configured inactivity timeout, that a MAC address that has been reachable over the given PDU session is no longer active, the UPF reports this event to the SMF. The SMF then removes the filter for the source address. As above, optionally, it can be possible to dynamically change the inactivity timeout to a lower layer in case of network topology change in order to achieve a faster convergence time of the network topology update. It can be determined from protocol information, such as from the messages and fields of the RSTP that there is an ongoing topology change.

When present, VLAN tags may be considered in combination with the MAC address to perform the reporting to the SMF and for filtering on a per VLAN basis for the given MAC address.

Figure 8:
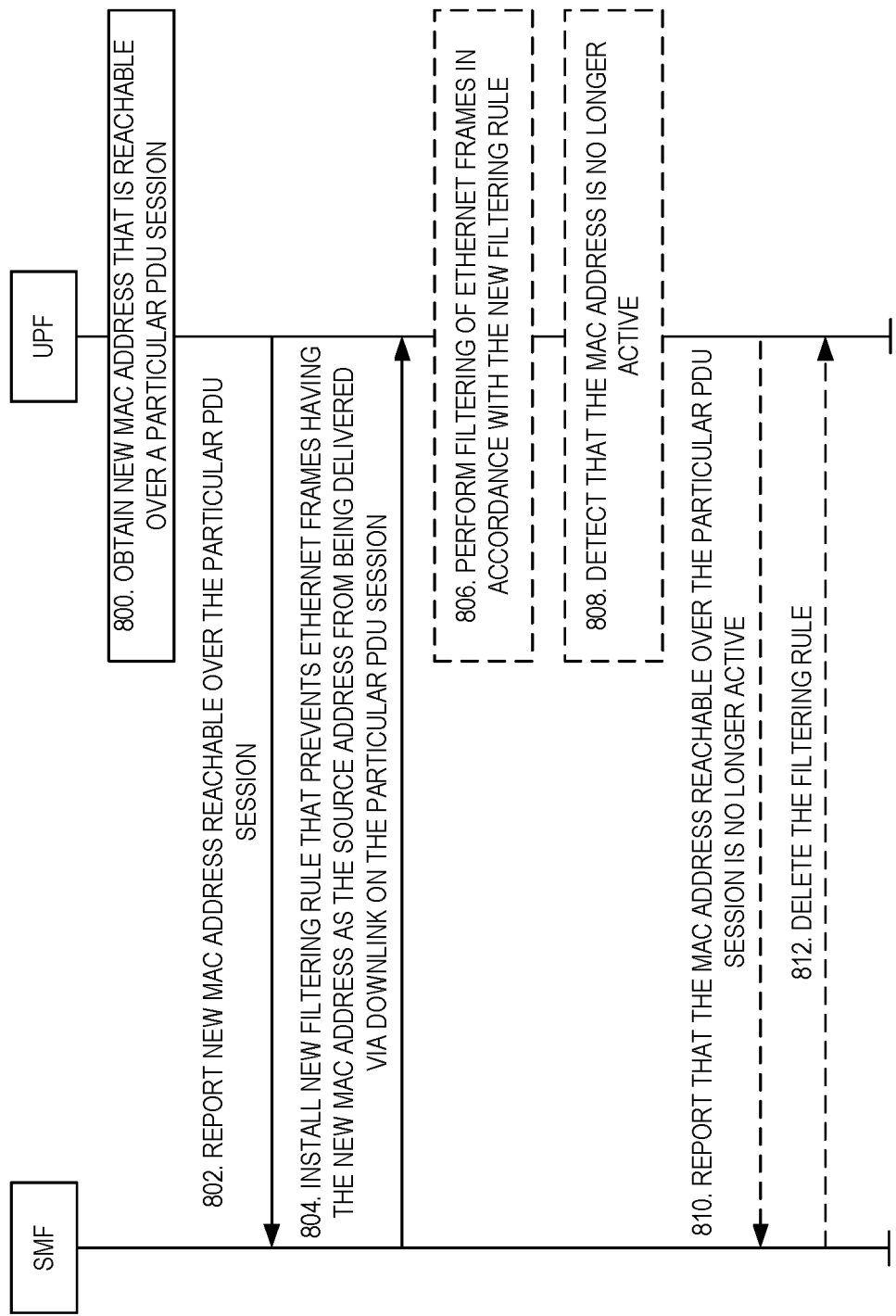
FIG. 8 illustrates the operation of a UPF and a Session Management Function (SMF) to provide loopback avoidance in accordance with at least some aspects of the present disclosure.

FIG. 8 illustrates at least some aspects of the SMF based embodiment. As illustrated, a UPF (e.g., UPF 514) obtains a new MAC address that is reachable over a particular PDU session (step 800). In some embodiments, the UPF detects (i.e., learns) a new MAC address that is reachable (via downlink) via the particular PDU session. In other embodiments, the UPF otherwise obtains the new MAC address (e.g., is configured with the new MAC address that is reachable over the particular PDU session). The UPF reports the new MAC address reachable via the particular PDU session to the SMF (e.g., SMF 508) (step 802). The SMF creates a new filtering rule that prevents Ethernet frames having the newly learned MAC address as the source MAC address from being delivered via downlink on the particular PDU session and installs the new filtering rule at the UPF (step 804). In other words, the SMF provides the new filtering rule to the UPF such that this new filtering rule is applied by the UPF to prevent Ethernet frames having the newly learned MAC address as the source address from being delivered via downlink on the particular PDU session. Optionally, the UPF performs filtering of Ethernet frames in accordance with the new filtering rule (step 806). Optionally, at some point, the UPF detects that the MAC address is no longer active (step 808) and reports to the SMF that the MAC address reachable over the particular PDU session is no longer active (step 810). Optionally, the SMF instructs the UPF to delete (or otherwise inactivate or remove) the filtering rule such that the filtering rule is no longer applied by the UPF (step 812).

In some embodiments, a capability indication is provided. More specifically, in some embodiments, the UPF based embodiment and the SMF based embodiment can be used together. For example, in some embodiments, the UPF indicates to the SMF whether it can automatically install filtering of the source address as described above for the UPF based embodiment. This indication helps the SMF to know whether the SMF needs to install such filters explicitly as described above for the SMF based embodiment. For example, if the UPF indicates that it can automatically install filtering of the source address as described above for the UPF based embodiment, the SMF does not need to install such filters explicitly for that UPF as described above for the SMF based embodiment. However, if the UPF indicates that it cannot automatically install filtering of the source address as described above for the UPF based embodiment (or does not indicate that it can automatically install filtering of the source address as described above for the UPF based embodiment), the SMF installs such filters explicitly for that UPF as described above for the SMF based embodiment.

The UPF and/or SMF may be configured to perform the filtering of the source address as described above. In cases when the UPF is also acting as an Ethernet switch and takes part in the spanning tree protocol in the Ethernet network, the filtering of the source address may be omitted, as the Ethernet switch would limit flooding to the spanning tree, which avoids the loops.

It may be possible to limit the filtering of the source address to a certain set of PDU sessions only based on configuration.

Figure 9:
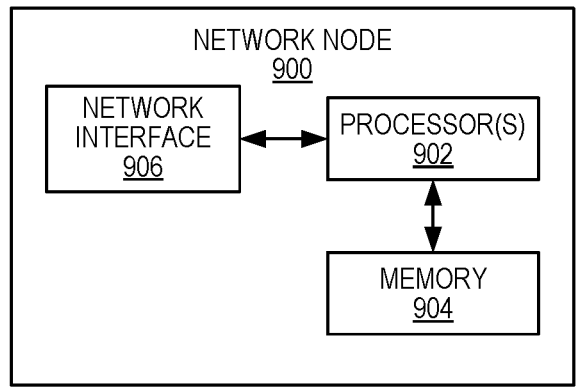
FIGS. 9 to 11 are schematic block diagrams of a network node that can implement functionality of a core network function (e.g., a UPF or SMF) in accordance with embodiments of the present disclosure.

FIG. 9 is a schematic block diagram of a network node 900 according to some embodiments of the present disclosure. The network node 900 is a network node that implements one or more core network entities in accordance with any of the embodiments disclosed herein. For example, the network node 900 may implement a core network function such as, e.g., the UPF or SMF described above. As illustrated, the network node 900 includes one or more processors 902 (e.g., Central Processing Unit (CPUs), Application Specific Integrated Circuits (ASICs), Field Programmable Gate Arrays (FPGAs), and/or the like), memory 904, and a network interface 906. The one or more processors 902 are also referred to herein as processing circuitry. The one or more processors 902 operate to provide one or more functions of a core network entity as described herein (e.g., one or more functions of a UPF as described above, e.g., with respect to FIG. 7 or 8 or one or more functions of a SMF as described above, e.g., with respect to FIG. 8). In some embodiments, the function(s) are implemented in software that is stored, e.g., in the memory 904 and executed by the one or more processors 902.

Figure 10:
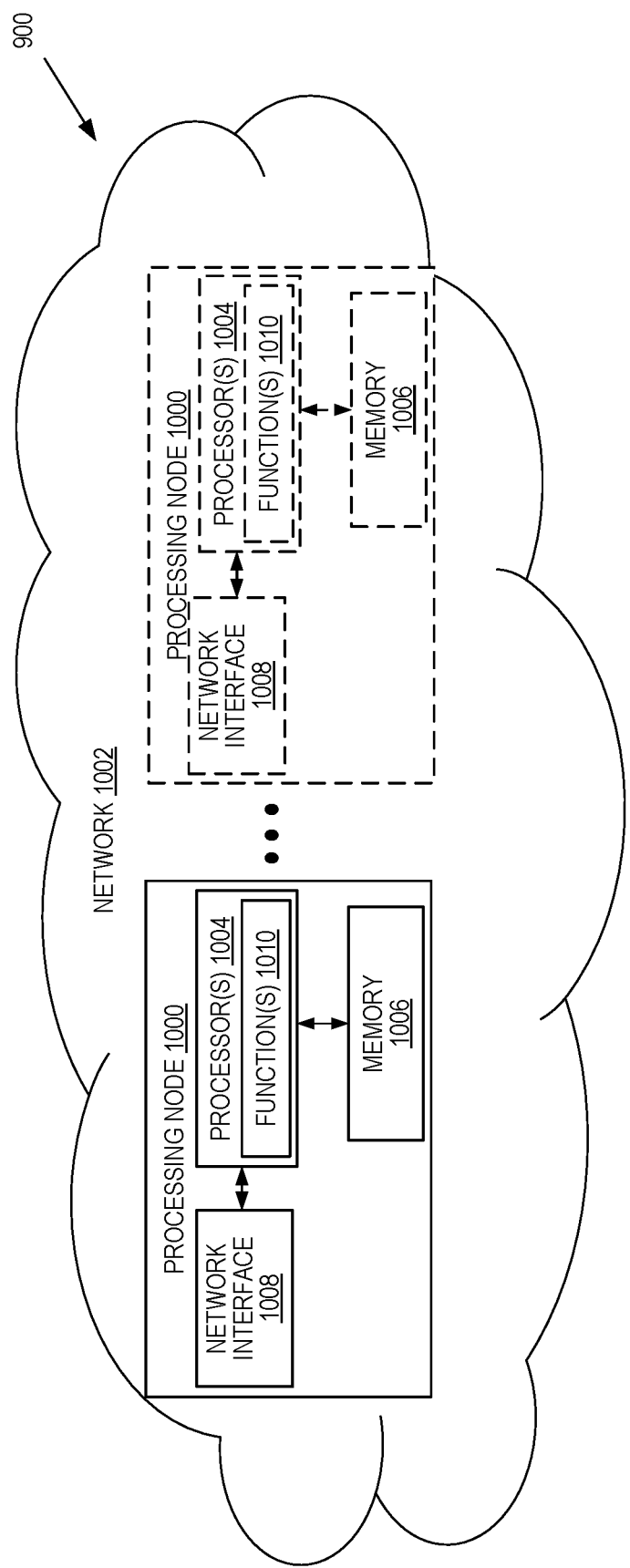

FIG. 10 is a schematic block diagram that illustrates a virtualized embodiment of the network node 900 according to some embodiments of the present disclosure. This discussion is equally applicable to other types of network nodes. Further, other types of network nodes may have similar virtualized architectures.

As used herein, a "virtualized" network node is an implementation of the network node 900 in which at least a portion of the functionality of the network node 900 is implemented as a virtual component(s) (e.g., via a virtual machine(s) executing on a physical processing node(s) in a network(s)). As illustrated, in this example, the network node 900 includes one or more processing nodes 1000 coupled to or included as part of a network(s) 1002 via the network interface 908. Each processing node 1000 includes one or more processors 1004 (e.g., CPUs, ASICs, FPGAs, and/or the like), memory 1006, and a network interface 1008.

In this example, functions 1010 of the network node 900 described herein (e.g., one or more functions of a UPF as described above, e.g., with respect to FIG. 7 or 8 or one or more functions of a SMF as described above, e.g., with respect to FIG. 8) are implemented at the one or more processing nodes 1000 or distributed across the one or more processing nodes 1000 in any desired manner. In some particular embodiments, some or all of the functions 1010 of the network node 900 described herein are implemented as virtual components executed by one or more virtual machines implemented in a virtual environment(s) hosted by the processing node(s) 1000.

In some embodiments, a computer program including instructions which, when executed by at least one processor, causes the at least one processor to carry out the functionality of network node 900 (e.g., one or more functions of a UPF as described above, e.g., with respect to FIG. 7 or 8 or one or more functions of a SMF as described above, e.g., with respect to FIG. 8) or a node (e.g., a processing node 1000) implementing one or more of the functions 1010 of the network node 900 (e.g., one or more functions of a UPF as described above, e.g., with respect to FIG. 7 or 8 or one or more functions of a SMF as described above, e.g., with respect to FIG. 8) in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 11:
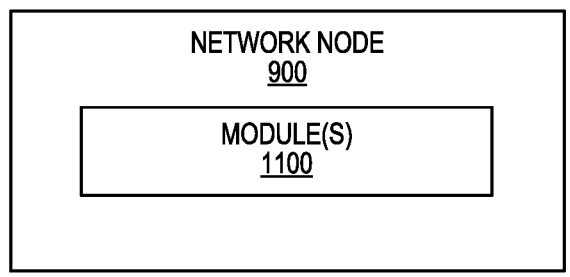

FIG. 11 is a schematic block diagram of the network node 900 according to some other embodiments of the present disclosure. The network node 900 includes one or more modules 1100, each of which is implemented in software. The module(s) 1100 provide the functionality of the network node 900 described herein (e.g., one or more functions of a UPF as described above, e.g., with respect to FIG. 7 or 8 or one or more functions of a SMF as described above, e.g., with respect to FIG. 8).

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Some example embodiments of the present disclosure are as follows.

Embodiment 1: A method performed by a User Plane Function, UPF, (514) in a core network of a cellular communications system, the method comprising: obtaining (700) a new Medium Access Control, MAC, address that is reachable over a particular Protocol Data Unit, PDU, session; and installing (702), at the UPF (514), a new filtering rule that prevents Ethernet frames having the new MAC address as a source address from being delivered by the UPF (514) via downlink on the particular PDU session.

Embodiment 2: The method of embodiment 1 further comprising performing (704) filtering of Ethernet frames at the UPF (514) in accordance with the new filtering rule.

Embodiment 3: The method of embodiment 2 wherein performing (704) filtering of Ethernet frames at the UPF (514) in accordance with the new filtering rule comprises performing (704) filtering of broadcast Ethernet frames at the UPF (514) in accordance with the new filtering rule.

Embodiment 4: The method of any one of embodiments 1 to 3 further comprising: determining (706) that the new filtering rule is to be deleted; and deleting (706) the new filtering rule at the UPF (514).

Embodiment 5: The method of embodiment 4 wherein determining (706) that the new filtering rule is to be deleted comprises detecting that the new MAC address is inactive.

Embodiment 6: The method of embodiment 4 wherein determining (706) that the new filtering rule is to be deleted comprises detecting, by a configured inactivity timeout, that the new MAC address is no longer active.

Embodiment 7: The method of embodiment 6 wherein the inactivity timeout is dynamically configured.

Embodiment 8: The method of any one of embodiments 1 to 7 wherein the particular PDU session is a PDU session between the UPF (514), which operates as a PDU session anchor, and a User Equipment, UE, in the cellular communications system.

Embodiment 9: A method performed by a User Plane Function, UPF, in a core network of a cellular communications system, the method comprising: obtaining (800) a new Medium Access Control, MAC, address that is reachable over a particular Protocol Data Unit, PDU, session; reporting (802) the new MAC address that is reachable over the particular PDU session to another network entity (e.g., a Session Management Function, SMF); and receiving (804), from the other network entity, a new filtering rule to be applied by the UPF (514) to prevent Ethernet frames having the new MAC address as a source address from being delivered by the UPF (514) via downlink on the particular PDU session.

Embodiment 10: The method of embodiment 9 further comprising performing (806) filtering of Ethernet frames at the UPF (514) in accordance with the new filtering rule.

Embodiment 11: The method of embodiment 10 wherein performing (806) filtering of Ethernet frames at the UPF (514) in accordance with the new filtering rule comprises performing (806) filtering of broadcast Ethernet frames at the UPF (514) in accordance with the new filtering rule.

Embodiment 12: The method of any one of embodiments 9 to 11 further comprising: determining (808) that the new MAC address is no longer reachable; and reporting (810), to the other network entity, that the new MAC address is no longer reachable.

Embodiment 13: The method of embodiment 12 further comprising receiving (812), from the other network entity, an instruction to delete the new filtering rule at the UPF (514).

Embodiment 14: The method of embodiment 12 or 13 wherein determining (808) that the new MAC address is no longer reachable comprises detecting, by a configured inactivity timeout, that the new MAC address is no longer active.

Embodiment 15: The method of embodiment 14 wherein the inactivity timeout is dynamically configured.

Embodiment 16: The method of any one of embodiments 9 to 15 wherein the particular PDU session is a PDU session between the UPF (514), which operates as a PDU session anchor, and a User Equipment, UE, in the cellular communications system.

Embodiment 17: A method performed by a network entity (e.g., a Session Management Function, SMF) in a core network of a cellular communications system, the method comprising: receiving (802) information from a User Plane Function, UPF, (514) that indicates a new Medium Access Control, MAC, address that is reachable over a particular Protocol Data Unit, PDU, session between the UPF (514), which acts as a PDU session anchor, and a User Equipment, UE; and sending (804), to the UPF (514), a new filtering rule that prevents Ethernet frames having the new MAC address as a source address from being delivered by the UPF (514) via downlink on the particular PDU session.

Embodiment 18: The method of embodiment 17 further comprising: receiving (810), from the UPF (514), information that indicates that the new MAC address is no longer reachable; and sending (812), to the UPF (514), an instruction to delete the new filtering rule.

Embodiment 19: A network node (900) adapted to, in order to implement a core network entity, perform the method of any one of embodiments 1 to 18.

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
5G Fifth Generation
5GC Fifth Generation Core
5GS Fifth Generation System
AF Application Function
AMF Access and Mobility Management Function
AN Access Network
ASIC Application Specific Integrated Circuit
AUSF Authentication Server Function
CPU Central Processing Unit
DN Data Network
DNN Data Network Name
DSP Digital Signal Processor
eNB Enhanced or Evolved Node B
EPC Evolved Packet Core
FPGA Field Programmable Gate Array
gNB New Radio Base Station
IP Internet Protocol
LTE Long Term Evolution
MAC Medium Access Control
MME Mobility Management Entity
MTC Machine Type Communication
NEF Network Exposure Function
NF Network Function
NR New Radio
NRF Network Repository Function
NSSF Network Slice Selection Function
PCF Policy Control Function
PDU Protocol Data Unit
P-GW Packet Data Network Gateway
PSA Protocol Data Unit Session Anchor QoS Quality of Service
RAM Random Access Memory
RAN Radio Access Network
ROM Read Only Memory
RRH Remote Radio Head
RSTP Rapid Spanning Tree Protocol
RTT Round Trip Time
SCEF Service Capability Exposure Function
SMF Session Management Function
TR Technical Report
TS Technical Specification
UDM Unified Data Management
UE User Equipment
UPF User Plane Function
VLAN Virtual Local Area Network Those skilled in the art will recognize improvements and modifications to the embodiments of the present disclosure. All such improvements and modifications are considered within the scope of the concepts disclosed herein.

What is claimed is:

1. A method performed by a User Plane Function (UPF) in a core network of a cellular communications system, the method comprising:
   obtaining a Medium Access Control (MAC) address that is reachable over a particular Protocol Data Unit (PDU) session; and
   installing, at the UPF, a filtering rule that prevents Ethernet frames having the MAC address as a source address from being delivered by the UPF via downlink on the particular PDU session.

2. The method of claim 1, further comprising performing filtering of Ethernet frames at the UPF in accordance with the filtering rule.

3. The method of claim 2, wherein performing filtering of Ethernet frames at the UPF in accordance with the filtering rule comprises performing filtering of broadcast Ethernet frames at the UPF in accordance with the filtering rule.

4. The method of claim 1, further comprising:
   determining that the filtering rule is to be deleted; and
   deleting the filtering rule at the UPF.

5. The method of claim 4, wherein determining that the filtering rule is to be deleted comprises detecting that the MAC address is inactive.

6. The method of claim 4, wherein determining that the filtering rule is to be deleted comprises detecting, by a configured inactivity timeout, that the MAC address is no longer active.

7. The method of claim 6, wherein the inactivity timeout is dynamically configured.

8. The method of claim 1, wherein the particular PDU session is a PDU session between the UPF, which operates as a PDU session anchor, and a User Equipment (UE) in the cellular communications system.

9. A network node that implements a User Plane Function (UPF) in a core network of a cellular communications system, the network node comprising processing circuitry configured to cause the network node to:
   obtain a Medium Access Control (MAC) address that is reachable over a particular Protocol Data Unit (PDU) session; and
   install, at the UPF, a filtering rule that prevents Ethernet frames having the MAC address as a source address from being delivered by the UPF via downlink on the particular PDU session.

10. A method performed by a User Plane Function (UPF) in a core network of a cellular communications system, the method comprising:
    obtaining a Medium Access Control (MAC) address that is reachable over a particular Protocol Data Unit (PDU) session;
    reporting the MAC address that is reachable over the particular PDU session to another network entity; and
    receiving, from the other network entity, a filtering rule to be applied by the UPF to prevent Ethernet frames having the MAC address as a source address from being delivered by the UPF via downlink on the particular PDU session.

11. The method of claim 10, further comprising performing filtering of Ethernet frames at the UPF in accordance with the filtering rule.

12. The method of claim 11, wherein performing filtering of Ethernet frames at the UPF in accordance with the filtering rule comprises performing filtering of broadcast Ethernet frames at the UPF in accordance with the filtering rule.

13. The method of claim 10, further comprising:
    determining that the MAC address is no longer reachable; and
    reporting, to the other network entity, that the MAC address is no longer reachable.

14. The method of claim 13, further comprising receiving, from the other network entity, an instruction to delete the filtering rule at the UPF.

15. The method of claim 13, wherein determining that the MAC address is no longer reachable comprises detecting, by a configured inactivity timeout, that the MAC address is no longer active.

16. The method of claim 15, wherein the inactivity timeout is dynamically configured.

17. The method of claim 10, wherein the particular PDU session is a PDU session between the UPF, which operates as a PDU session anchor, and a User Equipment (UE) in the cellular communications system.

18. The method of claim 10, wherein the other network entity is a Session Management Function (SMF) in the core network of the cellular communications system.

19. A method performed by a network entity in a core network of a cellular communications system, the method comprising:
    receiving information from a User Plane Function (UPF) that indicates a Medium Access Control (MAC) address that is reachable over a particular Protocol Data Unit (PDU) session between the UPF, which acts as a PDU session anchor, and a User Equipment (UE); and
    sending, to the UPF, a filtering rule that prevents Ethernet frames having the MAC address as a source address from being delivered by the UPF via downlink on the particular PDU session.

20. The method of claim 19, further comprising:
    receiving, from the UPF, information that indicates that the MAC address is no longer reachable; and
    sending, to the UPF, an instruction to delete the filtering rule.

21. The method of claim 19, wherein the other network entity is a Session Management Function (SMF) in the core network of the cellular communications system.

* * * * *